(12) United States Patent
Carbone et al.

(10) Patent No.: US 9,566,744 B1
(45) Date of Patent: Feb. 14, 2017

(54) PASSIVE Z-AXIS ALIGNMENT

(71) Applicant: MakerBot Industries, LLC, Brooklyn, NY (US)

(72) Inventors: Philip C. Carbone, North Reading, MA (US); Warren J. Ellis, Jr., Worcester, MA (US); Mitchell J. Kelley, Brookline, MA (US); Kate E. Nevin, New York, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 0 days.

(21) Appl. No.: 15/339,053

(22) Filed: Oct. 31, 2016

Related U.S. Application Data

(63) Continuation of application No. 14/587,190, filed on Dec. 31, 2014, now Pat. No. 9,481,133.

(51) Int. Cl.
*B29C 67/00* (2006.01)
*B33Y 30/00* (2015.01)
*B33Y 50/02* (2015.01)

(52) U.S. Cl.
CPC ............ *B29C 67/0088* (2013.01); *B33Y 30/00* (2014.12); *B33Y 50/02* (2014.12)

(58) Field of Classification Search
CPC ............ B29C 67/0055; B29C 67/0059; B29C 67/0062; B29C 67/0066; B29C 67/007; B29C 67/0074; B29C 67/0077; B29C 67/0081; B29C 67/0085; B29C 67/0088; B33Y 30/00; B33Y 10/00; B33Y 50/00; B33Y 50/02
See application file for complete search history.

(56) References Cited

U.S. PATENT DOCUMENTS

| | | | |
|---|---|---|---|
| 9,481,133 B2 * | 11/2016 | Carbone | ............ B29C 67/0055 |
| 2015/0328837 A1 * | 11/2015 | Ventolina Cordero | ............ B29C 67/0085 425/132 |

* cited by examiner

*Primary Examiner* — Ryan Ochylski
(74) *Attorney, Agent, or Firm* — Strategic Patents, P.C.

(57) ABSTRACT

A three-dimensional printer positions a tool such as an extruder in three-dimensional space using a passive, i.e., non-motorized, z-axis alignment technique that generates z-axis movement based upon motorized movements along another axis. In this manner, intermittent z-axis step movements such as those from layer to layer in a multi-layer fabrication process can be performed without the need for an additional, dedicated motor for z-axis movement. The passive system may employ a variety of different gearing techniques to convert x-axis or y-axis movements into a z-axis movement under various conditions. For example, the three-dimensional printing tool may move to a predetermined position along a first axis (e.g., an x-axis or y-axis) where a passive gear assembly engages a rack or the like. When in this predetermined position along the first axis, the tool can move along a second axis and create a resulting movement on a third axis (e.g., the z-axis).

20 Claims, 9 Drawing Sheets

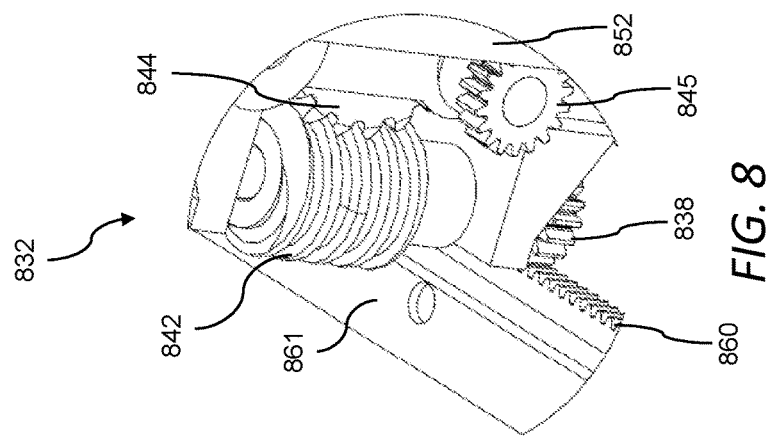
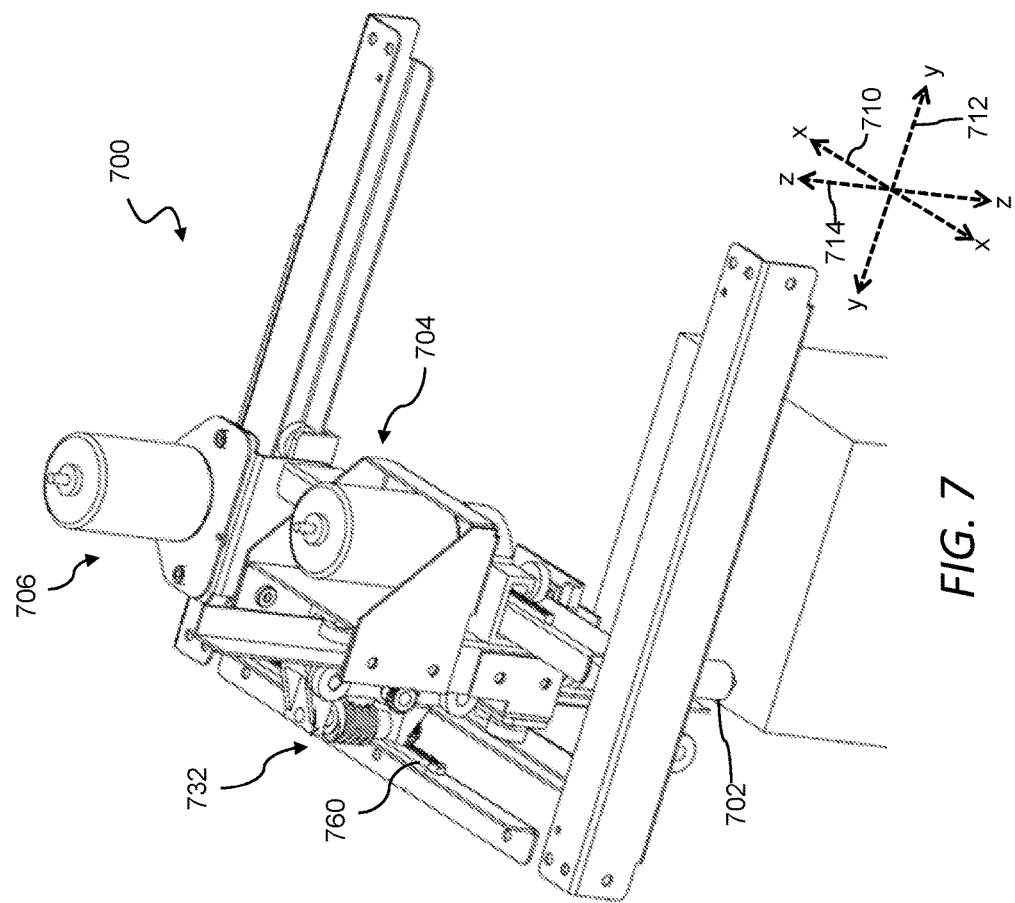

PASSIVE Z-AXIS ALIGNMENT

CROSS-REFERENCE TO RELATED APPLICATIONS

This application is a continuation of U.S. patent application Ser. No. 14/587,190 filed Dec. 31, 2014, the entire content of which is hereby incorporated by reference.

TECHNICAL FIELD

The present disclosure generally relates to techniques for using a single motor to control positioning along multiple axes in three-dimensional space.

BACKGROUND

A three-dimensional printer uses a number of motors such as DC stepper motors to facilitate movement of a tool such as an extruder in three-dimensional space. These motors can be expensive, and result in increased weight and cost for the overall printing system. There remains a need for techniques that use a single motor to control movement of a tool along more than one axis.

SUMMARY

A three-dimensional printer positions a tool such as an extruder in three-dimensional space using a passive, i.e., non-motorized, z-axis alignment technique that generates z-axis movement based upon motorized movements along some other axis. In this manner, intermittent z-axis step movements such as those from layer to layer in a multi-layer fabrication process can be performed without the need for an additional, dedicated motor for z-axis movement. The passive system may employ a variety of different gearing techniques to convert x-axis or y-axis movements into a z-axis movement under various conditions. For example, the three-dimensional printing tool may move to a predetermined position along a first axis (e.g., an x-axis or y-axis) where a passive gear assembly engages a rack or the like. When in this predetermined position along the first axis, the tool can move along a second axis and create a resulting movement on a third axis (e.g., the z-axis).

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 7 is a top perspective view of a robotic system for positioning along an x-axis, a y-axis, and a z-axis in three-dimensional space.

FIG. 8 is a close-up view of a passive gear assembly.

DETAILED DESCRIPTION

Figure 1:
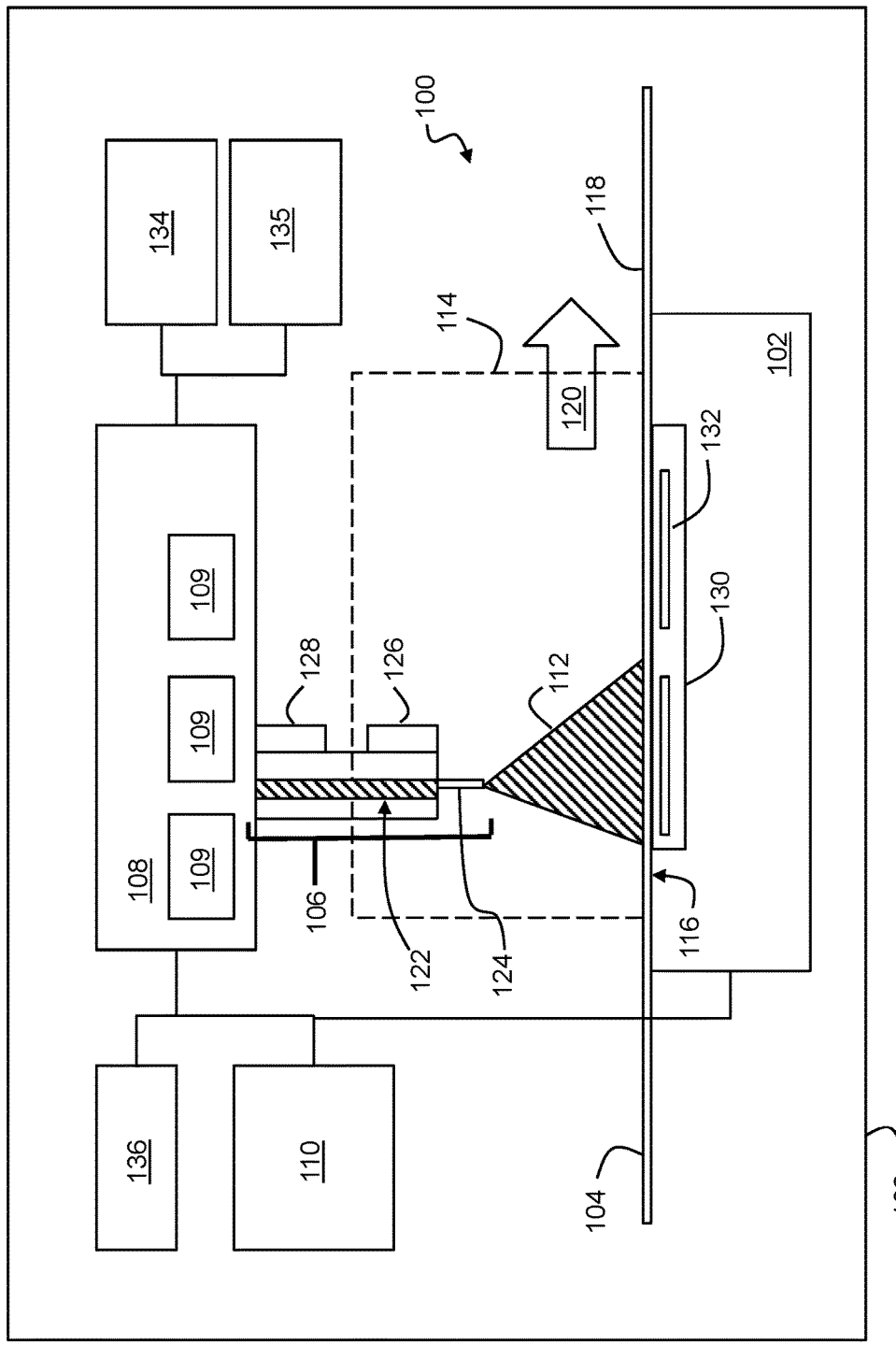
FIG. 1 is a block diagram of a three-dimensional printer.

The embodiments will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," "left," "right," "above," "below," and the like, are words of convenience and are not to be construed as limiting terms.

Described herein are devices, systems, and methods for passive z-axis alignment, and more specifically to devices, systems, and methods for passive z-axis alignment in robotic systems. These robotic systems may include, without limitation, assembly or manufacturing systems. For example, the robotic systems may include three-dimensional fabrication systems. It will be understood that while the exemplary embodiments below emphasize three-dimensional fabrication systems using extrusion, the principles of the invention may be adapted to a wide variety of robotic systems, and a variety of three-dimensional fabrication processes. Some examples may include additive fabrication processes including without limitation selective laser sintering, fused deposition modeling, three-dimensional printing, and the like. All such variations of robotic systems that can be adapted to use with passive z-axis alignment techniques as described herein are intended to fall within the scope of this disclosure. It should also be understood that any reference herein to a fabrication process such as printing or three-dimensional printing is intended to refer to any and all such additive fabrication processes unless a different meaning is explicitly stated or otherwise clear from the context. Thus, by way of example and not of limitation, a three-dimensional printer (or simply "printer") that may be adapted to utilize passive z-axis alignment techniques in a three-dimensional printing environment is described with reference to FIG. 1.

This disclosure generally refers to passive z-axis alignment techniques and in doing so describes an x, y, and z-axis. One skilled in the art will understand that the x, y, and z-axis as used herein are words of convenience for describing positioning within three dimensions and are thus used herein for reference only unless explicitly stated or otherwise clear from the context. As such, another coordinate system or combination of coordinate systems may also or instead be employed. For example, an x-axis typically describes an east-west/right-left directional axis, but it may be another axis entirely (e.g., it may be the north-south/up-down directional axis typically reserved for a y-axis). Similarly, the z-axis typically describes an up-down directional axis in three-dimensional space, but it may be another axis entirely (e.g., the east-west/right-left directional axis typically reserved for an x-axis). Notwithstanding the above, in general this disclosure references a three-dimensional printer where the build plane of an object being fabricated (e.g., the build platform) includes the x and y axes, where the z-axis is normal to the build plane. Thus, in one aspect, an extruder of a three-dimensional printer deposits material on a build platform forming a shape in two-dimensions by moving along the x and y axes thereby creating a layer of an object being fabricated, and then the extruder moves upward along the z-axis to create a layer of an object being fabricated on top of the previously created layer.

FIG. 1 is a block diagram of a three-dimensional printer. In general, the printer 100 may include a build platform 102, a conveyor 104, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may support the conveyer 104 in order to provide a fixed, dimensionally and positionally stable platform on which to build the object 112.

The build platform 102 may include a thermal element 130 that controls the temperature of the build platform 102 through one or more active devices 132 such as resistive elements that convert electrical current into heat, Peltier effect devices that can create a heating or cooling effect, or any other thermoelectric heating and/or cooling devices. Thus the thermal element 130 may be a heating element that provides active heating to the build platform 102, a cooling element that provides active cooling to the build platform 102, or a combination of these. The heating element 130 may be coupled in a communicating relationship with the controller 110 in order for the controller 110 to controllably impart heat to or remove heat from the surface 116 of the build platform 102. Thus the thermal element 130 may include an active cooling element positioned within or adjacent to the build platform 102 to controllably cool the build platform 102.

It will be understood that a variety of other techniques may be employed to control a temperature of the build platform 102. For example, the build platform 102 may use a gas cooling or gas heating device such as a vacuum chamber or the like in an interior thereof, which may be quickly pressurized to heat the build platform 102 or vacated to cool the build platform 102 as desired. As another example, a stream of heated or cooled gas may be applied directly to the build platform 102 before, during, and/or after a build process. Any device or combination of devices suitable for controlling a temperature of the build platform 102 may be adapted to use as the thermal element 130 described herein.

The conveyer 104 may be formed of a sheet 118 of material that moves in a path 120 through the working volume 114. Within the working volume 114, the path 120 may pass proximal to the surface 116 of the build platform 102—that is, resting directly on or otherwise supported by the surface 116—in order to provide a rigid, positionally stable working surface for a build. It will be understood that while the path 120 is depicted as a unidirectional arrow, the path 120 may be bidirectional, such that the conveyer 104 can move in either of two opposing directions through the working volume 114. It will also be understood that the path 120 may curve in any of a variety of ways, such as by looping underneath and around the build platform 102, over and/or under rollers, or around delivery and take up spools for the sheet 118 of material. Thus, while the path 120 may be generally (but not necessarily) uniform through the working volume 114, the conveyer 104 may move in any direction suitable for moving completed items from the working volume 114. The conveyor may include a motor or other similar drive mechanism (not shown) coupled to the controller 110 to control movement of the sheet 118 of material along the path 120. Various drive mechanisms are shown and described in further detail below.

In general, the sheet 118 may be formed of a flexible material such as a mesh material, a polyamide, a polyethylene terephthalate (commercially available in bi-axial form as MYLAR), a polyimide film (commercially available as KAPTON), or any other suitably strong polymer or other material. The sheet 118 may have a thickness of about three to seven thousandths of an inch, or any other thickness that permits the sheet 118 to follow the path 120 of the conveyer 104. For example, with sufficiently strong material, the sheet 118 may have a thickness of one to three thousandths of an inch. The sheet 118 may instead be formed of sections of rigid material joined by flexible links.

A working surface of the sheet 118 (e.g., an area on the top surface of the sheet 118 within the working volume 114) may be treated in a variety of manners to assist with adhesion of build material to the surface 118 and/or removal of completed objects from the surface 118. For example, the working surface may be abraded or otherwise textured (e.g., with grooves, protrusions, and the like) to improve adhesion between the working surface and the build material.

A variety of chemical treatments may be used on the working surface of the sheet 118 of material to further facilitate build processes as described herein. For example, the chemical treatment may include a deposition of material that can be chemically removed from the conveyer 104 by use of water, solvents, or the like. This may facilitate separation of a completed object from the conveyer by dissolving the layer of chemical treatment between the object 112 and the conveyer 104. The chemical treatments may include deposition of a material that easily separates from the conveyer such as a wax, mild adhesive, or the like.

The chemical treatment may include a detachable surface such as an adhesive that is sprayed on to the conveyer 104 prior to fabrication of the object 112.

In one aspect, the conveyer 104 may be formed of a sheet of disposable, one-use material that is fed from a dispenser and consumed with each successive build.

In one aspect, the conveyer 104 may include a number of different working areas with different surface treatments adapted for different build materials or processes. For example, different areas may have different textures (smooth, abraded, grooved, etc.). Different areas may be formed of different materials. Different areas may also have or receive different chemical treatments. Thus a single conveyer 104 may be used in a variety of different build processes by selecting the various working areas as needed or desired.

The extruder 106 may include a chamber 122 in an interior thereof to receive a build material. The build material may, for example, include acrylonitrile butadiene styrene ("ABS"), high-density polyethylene ("HDPL"), polylactic acid, or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure. As noted above, other techniques may be employed for three-dimensional printing, including extrusion-based techniques using a build material that is curable and/or a build material of sufficient viscosity to retain shape after extrusion.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. Any such arrangement suitable for controllably positioning the extruder 106 within the working volume 114 may be adapted to use with the printer 100 described herein.

By way of example and not limitation, the conveyer 104 may be affixed to a bed that provides x-y positioning within the plane of the conveyer 104, while the extruder 106 can be independently moved along a z-axis. As another example, the extruder 106 may be stationary while the conveyor 104 is x, y, and z positionable. As another example, the extruder 106 may be x, y, and z positionable while the conveyer 104 remains fixed (relative to the working volume 114). In yet another example, the conveyer 104 may, by movement of the sheet 118 of material, control movement in one axis (e.g., the y-axis), while the extruder 106 moves in the z-axis as well as one axis in the plane of the sheet 118. Thus in one aspect, the conveyor 104 may be attached to and move with at least one of an x-axis stage (that controls movement along the x-axis), a y-axis stage (that controls movement along a y-axis), and a z-axis stage (that controls movement along a z-axis) of the x-y-z positioning assembly 108. More generally, any arrangement of motors and other hardware controllable by the controller 110 may serve as the x-y-z positioning assembly 108 in the printer 100 described herein. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically coupled in a communicating relationship with the build platform 102, the conveyer 104, the x-y-z positioning assembly 108, and the other various components of the printer 100. In general, the controller 110 is operable to control the components of the printer 100, such as the build platform 102, the conveyer 104, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, the controller 110 may include a microprocessor or other processing circuitry with sufficient computational power to provide related functions such as executing an operating system, providing a graphical user interface (e.g., to a display coupled to the controller 110 or printer 100), convert three-dimensional models into tool instructions, and operate a web server or otherwise host remote users and/or activity through the network interface 136 described below.

A variety of additional sensors may be usefully incorporated into the printer 100 described above. These are generically depicted as sensor 134 in FIG. 1, for which the positioning and mechanical/electrical interconnections with other elements of the printer 100 will depend upon the type and purpose of the sensor 134 and will be readily understood and appreciated by one of ordinary skill in the art. The sensor 134 may include a temperature sensor positioned to sense a temperature of the surface of the build platform 102. This may, for example, include a thermistor or the like embedded within or attached below the surface of the build platform 102. This may also or instead include an infrared detector or the like directed at the surface 116 of the build platform 102 or the sheet 118 of material of the conveyer 104. Other sensors that may be usefully incorporated into the printer 100 as the sensor 134 include a heat sensor, a volume flow rate sensor, a weight sensor, a sound sensor, and a light sensor. Certain more specific examples are provided below by way of example and not of limitation.

The sensor 134 may include a sensor to detect a presence (or absence) of the object 112 at a predetermined location on the conveyer 104. This may include an optical detector arranged in a beam-breaking configuration to sense the presence of the object 112 at a location such as an end of the conveyer 104. This may also or instead include an imaging device and image processing circuitry to capture an image of the working volume 114 and analyze the image to evaluate a position of the object 112. This sensor 134 may be used for example to ensure that the object 112 is removed from the conveyer 104 prior to beginning a new build at that location on the working surface such as the surface 116 of the build platform 102. Thus the sensor 134 may be used to determine whether an object is present that should not be, or to detect when an object is absent. The feedback from this sensor 134 may be used by the controller 110 to issue processing interrupts or otherwise control operation of the printer 100.

The sensor 134 may include a sensor that detects a position of the conveyer 104 along the path. This information may be obtained from an encoder in a motor that drives the conveyer 104, or using any other suitable technique such as a visual sensor and corresponding fiducials (e.g., visible patterns, holes, or areas with opaque, specular, transparent, or otherwise detectable marking) on the sheet 118.

The sensor 134 may include a heater (instead of or in addition to the thermal element 130) to heat the working volume 114 such as a radiant heater or forced hot air to maintain the object 112 at a fixed, elevated temperature throughout a build. The sensor 134 may also or instead include a cooling element to maintain the object 112 at a predetermined sub-ambient temperature throughout a build.

The sensor 134 may also or instead include at least one video camera. The video camera may generally capture images of the working volume 114, the object 112, or any other hardware associated with the printer 100. The video camera may provide a remote video feed through the network interface 136, which feed may be available to remote users through a user interface maintained by, e.g., remote hardware such as a three-dimensional print server, or within a web page provided by a web server hosted by the three-dimensional printer 100. Thus in one aspect there is disclosed herein a user interface adapted to present a video feed from at least one video camera of a three-dimensional printer to a remote user through a user interface.

The sensor 134 may also include more complex sensing and processing systems or subsystems, such as a three-dimensional scanner using optical techniques (e.g., stereoscopic imaging, or shape from motion imaging), structured light techniques, or any other suitable sensing and processing hardware that might extract three-dimensional information from the working volume 114. In another aspect, the sensor 134 may include a machine vision system that captures images and analyzes image content to obtain information about the status of a job, working volume 114, or an object 112 therein. The machine vision system may support a variety of imaging-based automatic inspection, process control, and/or robotic guidance functions for the three-dimensional printer 100 including without limitation pass/fail decisions, error detection (and corresponding audible or visual alerts), shape detection, position detection, orientation detection, collision avoidance, and so forth.

Other components, generically depicted as other hardware 135, may also be included, such as input devices including a keyboard, touchpad, mouse, switches, dials, buttons, motion sensors, and the like, as well as output devices such as a display, a speaker or other audio transducer, light emitting diodes, and so forth. Other hardware 135 may also or instead include a variety of cable connections and/or hardware adapters for connecting to, e.g., external computers, external hardware, external instrumentation or data acquisition systems, and so forth.

The printer 100 may include, or be connected in a communicating relationship with, a network interface 136. The network interface 136 may include any combination of hardware and software suitable for coupling the controller 110 and other components of the printer 100 to a remote computer in a communicating relationship through a data network. By way of example and not limitation, this may include electronics for a wired or wireless Ethernet connection operating according to the IEEE 802.11 standard (or any variation thereof), or any other short or long range wireless networking components or the like. This may include hardware for short range data communications such as BluTooth or an infrared transceiver, which may be used to couple into a local area network or the like that is in turn coupled to a data network such as the Internet. This may also or instead include hardware/software for a WiMax connection or a cellular network connection (using, e.g., CDMA, GSM, LTE, or any other suitable protocol or combination of protocols). Consistently, the controller 110 may be configured to control participation by the printer 100 in any network to which the network interface 136 is connected, such as by autonomously connecting to the network to retrieve printable content, or responding to a remote request for status or availability.

The printer 100 may include an outer enclosure 138. The outer enclosure 138 may generally enclose the working volume 114 and other components of the printer 100 (e.g., the build platform 102, conveyer 104, extruder 106, x-y-z positioning assembly 108, and so forth). The outer enclosure 138 may substantially seal the working volume 114 from the surrounding environment, or simply surround the working volume 114 and other components of the printer 100 for their protection or the protection of a user, or for another purpose (e.g., aesthetic reasons). The outer enclosure 138 may include a door, window, viewing area, or the like to provide access to the working volume 114 or a line of sight to the working volume 114. In one aspect, the outer enclosure 138 is a frame that surrounds the components of the printer 100.

The printer 100 described above, or components of the printer 100 described above may be used in the devices, systems, and methods for passive z-axis alignment described in more detail below. One skilled in the art will understand that certain adaptations to the above described printer 100 may be necessitated to include features for passive z-axis alignment described herein, and all such adaptations are intended to fall within the scope of this disclosure.

Figure 2:
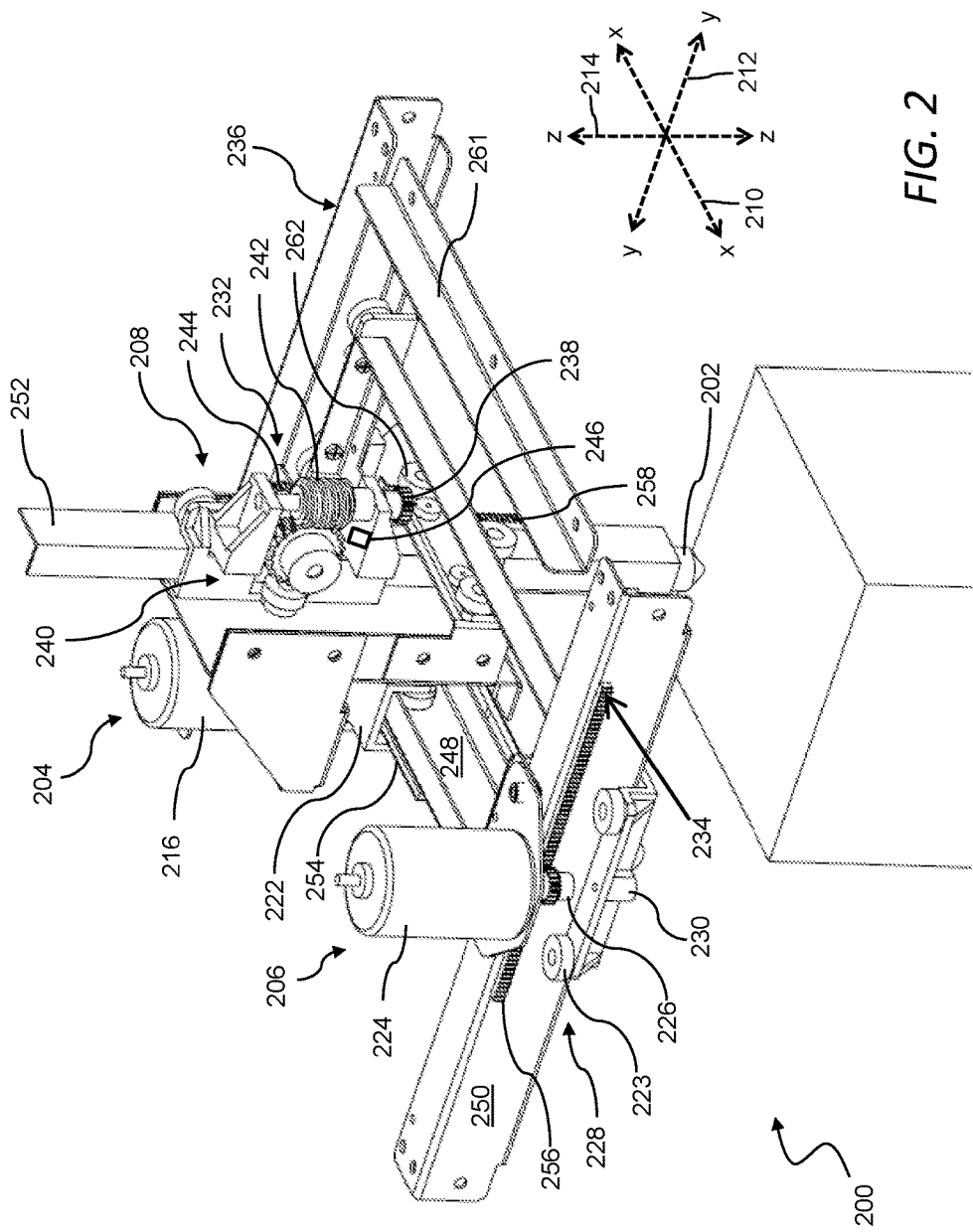
FIG. 2 is a perspective view of a robotic system for positioning along an x-axis, a y-axis, and a z-axis in three-dimensional space.

FIG. 2 is a perspective view of a robotic system for positioning along an x-axis, a y-axis, and a z-axis in three-dimensional space. The robotic system 200 may generally be an x-y-z positioning system as contemplated above, and may be adapted for passive z-axis alignment where a tool is configured to move along the z-axis without a dedicated motor or other independent source of mechanical power. For example, the tool may be configured to move along the z-axis when there is a specific movement of another component of the robotic system 200. The robotic system 200 may include or be a part of a three-dimensional fabrication system. While use in a three-dimensional printer is expressly contemplated by this disclosure, it will be understood that the principles of this disclosure may readily be adapted to any other context where x-y-z positioning assemblies can benefit from the elimination of an active drive component such as a stepper motor.

In general, a robotic gantry may include an x-y positioning system that can be used to position a tool within an x-y fabrication plane. When moved to a specific x or y position, e.g., an edge of the build volume, a gear system or the like may be engaged that generates z-axis movement of a tool. Thus for example, the tool may be moved to a particular x position (e.g., a left or right edge of the build volume), and then moved along the x-axis with changes in the y position. This movement along the x-axis can then be converted by the passive z-axis assembly into corresponding movement along the z-axis. This general operating principle may be achieved with a variety of gearing assemblies and the like, and advantageously facilitates the removal of at least one motor—one of the more expensive components—from the robotic gantry.

In general, the robotic system 200 may include a controller, a tool 202, an x-positioning system 204, a y-positioning system 206, and a z-positioning system 208. The robotic system 200 may be configured for positioning the tool 202 along an x-axis 210, a y-axis 212, and a z-axis 214 in three-dimensional space.

The controller may be any of the controllers described herein, e.g., with reference to FIG. 1, or another controller known in the art. The controller may control one or more components of the robotic system 200 including without limitation the tool 202, the x-positioning system 204, the y-positioning system 206, the z-positioning system 208, or any subcomponents thereof.

The tool 202 may include a three-dimensional printing tool such as an extruder or the like for depositing material in an additive fabrication process to form an object. The three-dimensional printing tool may also or instead include a laser, a welding device, a heater, and so forth. The tool 202 may also or instead include any tool that can be usefully employed in a robotic system 200 with passive z-axis alignment including without limitation a sensor, an optical device, a camera, a fastening apparatus, a heat source, a fan, a cutting device, a light source, a radiation source, a surgical tool, and so forth.

The x-positioning system 204 may be configured to move the tool 202 along the x-axis 210, and may include a first drive motor 216, a first drive gear (not shown in FIG. 2), and a first mechanical system (not shown in FIG. 2).

The first drive motor 216 may be responsive to signals from the controller to rotate the first drive gear, where the first mechanical system is coupled to the first drive gear and configured to respond to rotation of the first drive gear by moving the tool 202 along the x-axis 210. In general, the first drive motor 216 may be configured to drive the x-positioning system 204 or a component thereof for moving the tool 202 along the x-axis 210. The first drive motor 216 may include without limitation a stepper motor, a DC motor (e.g., an encoded DC motor, a brushless DC motor, a brushed motor, a shunt motor, a permanent magnet motor, a compounded motor, and so forth), a hysteresis motor, an AC motor, or any other motor suitable for driving a tool 202 along the x-axis 210 or otherwise rotating the first drive gear.

The first drive gear may be a mechanical element (e.g., a gear or combination of gears and other components for transmitting and translating mechanical force) configured for communication with the first drive motor 216, where the first drive gear responds to being driven by the first drive motor 216 in a manner that facilitates movement of the tool 202 along the x-axis 210. The first drive gear may be any type of gear known in the art, or any other type of mechanical element that is capable of cooperating with the first drive motor 216 and/or the first mechanical system for driving a tool 202 along the x-axis 210. The first drive gear may include without limitation a spur gear, a rack and pinion gear, a helical gear, a face gear, a worm gear, a hypoid gear, a bevel gear, a screw gear, and so forth.

The first mechanical system may be coupled to the first drive gear, or may itself include the first drive gear, where the first mechanical system is configured to respond to movement of the first drive gear (e.g., rotation of the first drive gear) by moving the tool 202 along the x-axis 210. In general, the first mechanical system may include a mechanical element, or a combination of mechanical elements, for facilitating movement of the tool 202 along the x-axis 210 by transmitting forces from the first drive motor 216. The first mechanical system may include gears, belts, pulleys, worm gears, threads, bearings, racks, rails, pins, sliders, springs, and so forth, as well as combinations of the foregoing. In one aspect, the first mechanical system includes a first carriage 222.

The first carriage 222 may facilitate movement of the tool 202 or component of the x-positioning system 204 along a first rail 248. The first carriage 222 may include a single part (e.g., a single molded part) with bearings or the like to facilitate movement on a frame member, e.g., a rail or a beam. Alternatively, the first carriage 222 may include different elements engaged with one another, e.g., a plurality of molded parts. The first carriage 222 may be designed with a specific bearing preload to control off-axis play, and a specific bearing spacing to control pitch and yaw.

The y-positioning system 206 may be configured to move the tool 202 along the y-axis 212, and may include a second drive motor 224, a second drive gear 226, and a second mechanical system 228.

The second drive motor 224 may be responsive to signals from the controller to rotate the second drive gear 226, where the second mechanical system 228 is coupled to the second drive gear 226 and configured to respond to rotation of the second drive gear 226 by moving the tool 202 along the y-axis 212. In general, the second drive motor 224 may be configured to drive the y-positioning system 206 or a component thereof for moving the tool 202 along the y-axis 212. The second drive motor 224 may be the same or similar to the first drive motor 216 described above, and thus may include any of the types of motors described herein or known in the art. In one aspect, a single motor may perform the functions of both the first drive motor 216 and the second drive motor 224.

The second drive gear 226 may be a mechanical element (e.g., a gear) configured for communication with the second drive motor 224, where the second drive gear 226 responds to being driven by the second drive motor 224 in a manner that facilitates movement of the tool 202 along the y-axis 212. The second drive gear 226 may be the same or similar to the first drive gear described above, and may thus include any of the types of gears described herein or known in the art, or any other type of mechanical element that is capable of cooperating with the second drive motor 224 and/or the second mechanical system 228 for driving a tool 202 along the y-axis 212.

The second mechanical system 228 may be coupled to the second drive gear 226, or it may itself include the second drive gear 226, where the second mechanical system 228 is configured to respond to movement of the second drive gear 226 (e.g., rotation of the second drive gear 226) by moving the tool 202 along the y-axis 212. In general, the second mechanical system 228 may include a mechanical element, or a series of mechanical elements, for facilitating movement of the tool 202 along the y-axis 212, e.g., where the tool 202 is driven by the second drive motor 224. The second mechanical system 228 may be the same or similar to the first mechanical system described above. In one aspect, the second mechanical system 228 includes a second carriage 230.

The second carriage 230 may facilitate movement of the tool 202 or component of the y-positioning system 206 along a second rail 250. The second carriage 230 may be the same or similar to the first carriage 222. The second carriage may include bearings 223 or the like (e.g., ball bearings) that enable movement of the tool 202 or a component of the y-positioning system 206 along the second rail 250. In another aspect, the bearings 223 may be replaced or supplemented by slip surfaces or the like.

The z-positioning system 208 may be configured to move the tool 202 along the z-axis 214, and may include a passive gear assembly 232. In an aspect, the z-positioning system 208 is only configured to move the tool 202 along the z-axis 214 when the y-positioning system 206 is in a predetermined position (shown by arrow 234) along the y-axis 212. One skilled in the art will recognize that the predetermined position may be disposed in other locations or multiple locations. In this embodiment, when the y-positioning system 206 is in the predetermined position (shown by arrow 234) along the y-axis 212, the passive gear assembly 232 may be responsive to a movement of the x-positioning system 204 along the x-axis 210 to move the tool 202 along the z-axis 214.

It will be appreciated that terms such as x-axis, y-axis, and z-axis are terms of convenience only, and are not intended to specify a particular relative orientation or otherwise limit the scope of this disclosure unless otherwise stated or clear from the context. While it is conventional in additive manufacturing to describe layers or height in terms of the z-axis, and the working plane at a particular height in terms of an x-axis and a y-axis, these conventions should not be interpreted as limiting the scope of this disclosure except where expressly stated to the contrary. Thus, for example, in an embodiment x-axis 210 movement by an active motor may cause a passive z-axis 214 movement when occurring in the predetermined position, or y-axis 212 movement may cause z-axis 214 movement in the predetermined position (e.g., when the predetermined position is a position along the x-axis 210), and so forth. However, a z-axis movement may instead cause a passive movement in the y-axis and so forth. One skilled in the art will recognize that specific axis labels used throughout do not limit the scope of this disclosure unless explicitly stated or otherwise clear from the context.

In another aspect, the z-positioning system 208 may also or instead include a drive motor, drive gear, and mechanical system, e.g., similar to those described above for the x-positioning system 204 and the y-positioning system 206, and the x-axis or the y-axis may be passively controlled through a z-axis movement.

The passive gear assembly 232 may include a rack and pinion configuration where the rack is coupled to the frame 236 of the robotic system 200, and the pinion 238 is part of a z-positioning subassembly 240. In one aspect, the rack may be coupled to an outer enclosure of the robotic system 200, e.g., where the frame 236 is built into or otherwise attached to or mounted in the outer enclosure. The passive gear assembly 232 may provide bi-directional movement of the tool 202 along the z-axis 214 in response to a corresponding bi-directional movement along the x-axis 210 when the y-positioning system 206 is in the predetermined position. That is, a movement in one direction along the control axis may result in a corresponding movement along the z-axis, with a contrary movement along the control axis resulting in a contrary movement along the z-axis. In this manner, an arbitrary position along the z-axis may be achieved by moving in the appropriate direction along the control axis. Where a large gearing ratio is used so that a large movement along the control axis results in a small movement along the z-axis, a number of consecutive passes along the control axis may be required to achieve the desired z-axis movement.

In one aspect, the passive gear assembly 232 uses at least a 10:1 speed reduction for converting the movement along the x-axis 210 into movement along the z-axis 214. A 10:1 speed reduction may enable 1-mm of y-axis 212 motion to cause 100-µm of z-axis 214 motion. In another aspect, the passive gear assembly uses a speed reduction selected from a group consisting of 20:1, 40:1, and 60:1 for converting the movement along the x-axis 210 into the movement along the z-axis 214. A person of ordinary skill will recognize that other speed reductions are also possible, or that speed increases are also possible where desired. In other words, the gearing ratios may vary in different implementations. Also, it will be understood that all movements described herein may be geared at a ratio such that a user can achieve fine control of movement of the tool 202 with movements of magnitude reasonable for the intended purpose of the robotic system 200.

The passive gear assembly 232 may replace a motor that would typically enable movement of the tool 202 along the z-axis 214, or the passive gear assembly 232 may work in conjunction with a z-axis motor (not shown in FIG. 2).

The z-positioning subassembly 240 may be included on the x-positioning system 204 as shown in FIG. 2. The z-positioning subassembly 240 may be configured to engage the rack of the passive gear assembly 232 when the y-positioning system 206 is in the predetermined position. In one aspect, the z-positioning subassembly 240 engages the rack of the passive gear assembly 232 when the pinion 238 engages the rack, which only occurs when the y-positioning system 206 is in the predetermined position (shown by arrow 234) along the y-axis 212. The z-positioning subassembly 240 may include a worm gear 242 positioned to translate movement along the x-axis 210 into rotation of a z-axis gear 244 (or series of gears) in the passive gear assembly 232, e.g., when the y-positioning system 206 is in the predetermined position (shown by arrow 234) along the y-axis 212. The z-positioning subassembly 240, or another element of the z-positioning system 204, may include a brake 246 for the passive gear assembly 232, which may be useful, e.g., if the worm gear 242 drifts. In one aspect, forward motion of the x-positioning system 204 causes the tool 202 to rise, while backward motion of the x-positioning system 204 causes the tool 202 to lower.

The x-positioning system 204, y-positioning system 206, and z-positioning system 208 may be part of a gantry movement system (as shown generally in FIG. 2) configured to allow for movement of the tool 202 along a first rail 248 disposed on the x-axis 210, a second rail 250 disposed on the y-axis 212, and a third rail 252 disposed on the z-axis 214. The first rail 248 may include a first rack 254 engaged by the first drive gear, the second rail 250 may include a second rack 256 engaged by the second drive gear 226, and the third rail 252 may include a third rack 258 engaged by the passive gear assembly 232. The frame 236 of the robotic system 200 may also include a fourth rail 261 having a fourth rack (not shown in FIG. 2) configured to engage with the z-positioning subassembly 240 when the y-positioning system 208 is in the predetermined position, where movement of the x-positioning system 204 along the x-axis 210 causes the tool 202 to move along the z-axis 214 when the z-positioning subassembly 240 is engaged with the fourth rack.

In one aspect, the z-positioning system 208 includes a third carriage 262 that facilitates movement of the tool 202 or a component of the z-positioning system 208 along a third rail 252. The third carriage 262 may be the same or similar to the first carriage 222 and/or the second carriage 230 described above.

As described herein, the robotic system 200 may be usefully employed for use in a three-dimensional fabrication process. For example, the controller may be configured to engage the z-positioning system 208 to change a z-axis position of the tool 202 between each layer of fabrication in a three-dimensional fabrication process. In this manner, after a layer of fabrication, the y-positioning system 206 may travel to the predetermined position for the x-positioning system 204 to make one or more passes along the x-axis 210 for adjusting the z-axis 214 position of the tool 202. The controller may also or instead be configured to perform an extended z-axis movement with a sequence of consecutive passes along the x-axis 210 at the predetermined position (shown by arrow 234) along the y-axis 212. This may be useful, for example, in an embodiment where the tool 202 includes a three-dimensional printing tool having an extruder, where the extended z-axis movement is used to reset a height of the extruder for a three-dimensional fabrication process.

In one aspect, the robotic system 200 may be a subassembly to a larger system, e.g., a three dimensional printing system. For example, the robotic system 200 may fit within a standard enclosure of a three-dimensional printing system.

The robotic system 200 may include a photo interrupter and code strip, e.g., as part of the control system that controls movement of the components of the robotic system 200. The photo interrupter and code strip may be built into one or more of the components of the robotic system 200. For example, the photo interrupter and code strip may be included within a structural element of the robotic system 200 to reduce size and risk of damage.

Although the movements described above are generally enabled through mechanical elements such as rack and pinion systems, a person of ordinary skill in the art will recognize that other means are possible for creating desired movements, where all are intended to fall within the scope of this disclosure. For example, an implementation may use a lead screw interacting with a gear, where the gear engages a rack. Thus, running the gear across the rack actuates the lead screw and moves the tool 202 along the z-axis 214.

Figure 3:
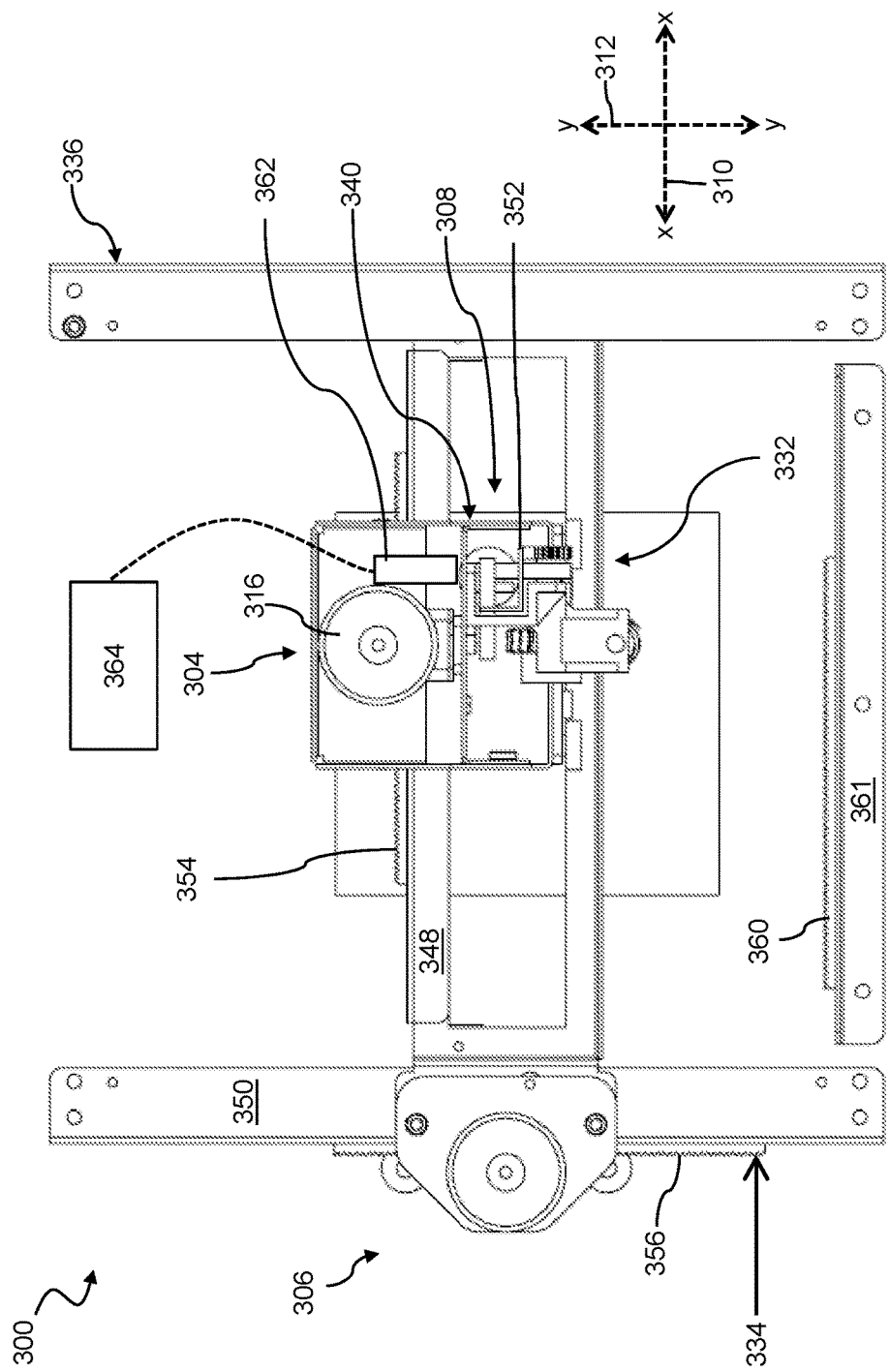
FIG. 3 is a top view of a robotic system for positioning along an x-axis, a y-axis, and a z-axis in three-dimensional space.

FIG. 3 is a top view of a robotic system for positioning along an x-axis, a y-axis, and a z-axis in three-dimensional space. Similar to FIG. 2, the robotic system 300 of FIG. 3 may be adapted for use for passive z-axis alignment. As shown in FIG. 3, the robotic system 300 may include an x-positioning system 304, a y-positioning system 306, and a z-positioning system 308. The robotic system 300 may be configured for positioning the tool along an x-axis 310, a y-axis 312, and a z-axis in three-dimensional space.

As described above, the robotic system 300 may include a gantry movement system enabled by the frame 336, which can be clearly seen in FIG. 3. The gantry movement system may be configured to allow for movement of the tool along a first rail 348 disposed on the x-axis 310, a second rail 350 disposed on the y-axis 312, and a third rail 352 disposed on the z-axis. The first rail 348 may include a first rack 354 engaged by the first drive gear, the second rail 350 may include a second rack 356 engaged by the second drive gear, and the third rail 352 may include a third rack engaged by the passive gear assembly 332. The frame 336 of the robotic system 300 may also include a fourth rail 361 having a fourth rack 360 configured to engage with the z-positioning subassembly 340 when the y-positioning system 308 is in the predetermined position, where movement of the x-positioning system 304 along the x-axis 310 causes the tool to move along the z-axis when the z-positioning subassembly 340 is engaged with the fourth rack 360. The fourth rack 360 may be the rack included as part of the passive gear assembly 332, where the pinion of the z-positioning subassembly 340 engages the rack of the passive gear assembly 332 when the pinion engages the fourth rack 360, which may occur when the y-positioning system 306 is in the predetermined position (shown by arrow 334) along the y-axis 312.

In one aspect, multiple racks may be positioned about the perimeter of the build volume so that a circumferential path around the build volume by the extruder or other tool assembly can more continuously engage a sequence of passive z-axis positioning assemblies with less loss of time as the x-y gantry travels from position to position where the passive system can be engaged.

In an alternate embodiment, the robotic system 300 may include a toggle 362. The toggle 362 may include a control 364 for switching a motor between engagement of one or more of the x-positioning system 304, y-positioning system 306, and z-positioning system 308. For example, the first drive motor 316 may be releasably coupled to the first drive gear when in a first position where it is responsive to signals from a controller to rotate the first drive gear. Further, the first mechanical system may be configured to respond to rotation of the first drive gear by moving the tool along the x-axis 310. Also, the z-positioning system may include a gear assembly (which may include the passive gear assembly 332 shown in FIG. 3) aligned for engagement with the first drive motor 316. In this embodiment, the toggle 362 may be engaged with the first drive motor 316, and may be configured for switching the first drive motor 316 from the first position to a second position where it is decoupled from the first drive gear and coupled with the gear assembly of the z-positioning system 308. The gear assembly may be responsive to movement of the first drive motor 316 to move the tool along the z-axis when the first drive motor 316 is in the second position. In this manner, the tool may be used for a specific layer in the x-y plane, and then the toggle 362 may be activated, where activation causes the tool to move along the z-axis. The toggle 362 may then be activated yet again to use the tool on a different layer in the x-y plane. In an implementation where the tool includes a three-dimensional printing tool with an extruder, the toggle 362 may enable switching between extrusion and movement along the z-axis. In yet another aspect, an extruder motor may also be used as the motor for driving the tool along the z-axis. In this manner, the toggle 362 may provide switching between driving a filament of build material (or the like) and moving the extruder along the z-axis, or alternatively moving a build platform along the z-axis. The toggle 362 may include a mechanical element, an electrical element, or any combination of mechanical and electrical elements, linkages, and communications to switch a motor between engagement of one or more of the x-positioning system 304, y-positioning system 306, and z-positioning system 308.

Figure 4:
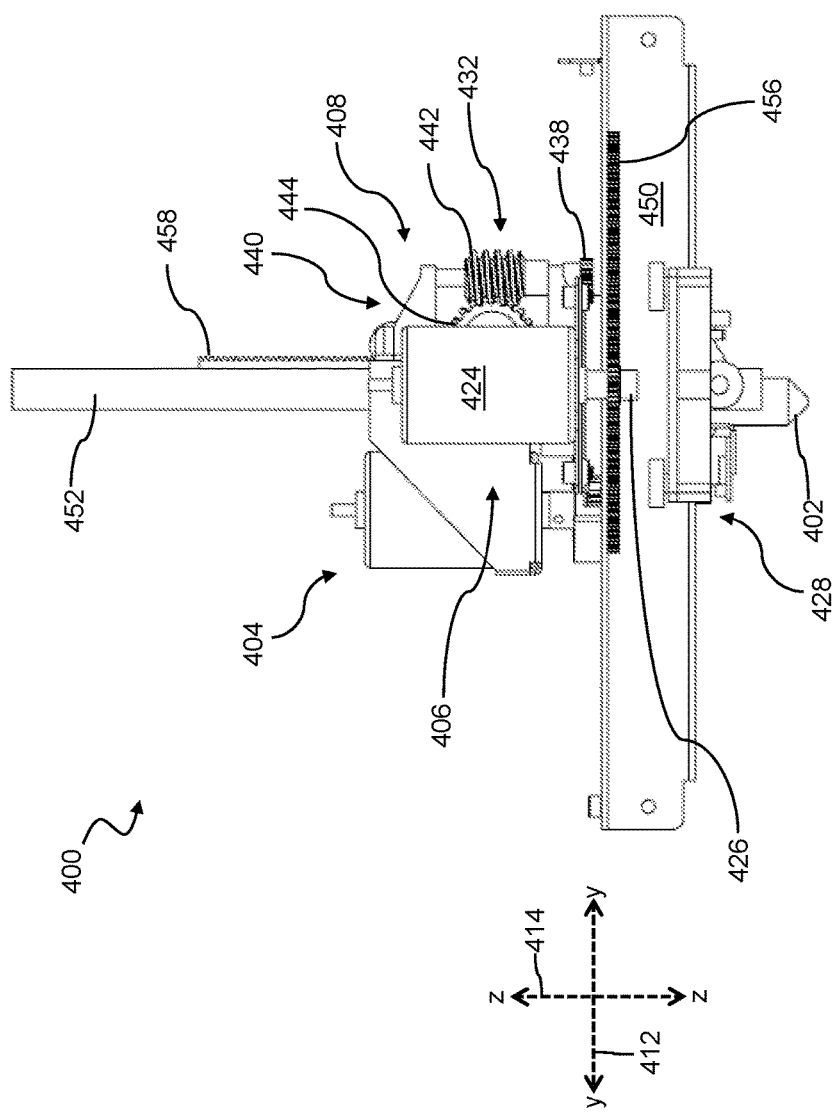
FIG. 4 is a side view of a robotic system for positioning along an x-axis, a y-axis, and a z-axis in three-dimensional space.

FIG. 4 is a side view of a robotic system for positioning along an x-axis, a y-axis, and a z-axis in three-dimensional space. As shown in FIG. 4, the robotic system 400 may include a tool 402, an x-positioning system 404, a y-positioning system 406, and a z-positioning system 408. The robotic system 400 may be configured for positioning the tool 402 along an x-axis, a y-axis 412, and a z-axis 414 in three-dimensional space.

FIG. 4 shows the y-positioning system 406, which may be configured to move the tool 402 along the y-axis 412, and may include a second drive motor 424, a second drive gear 426, and a second mechanical system 428. The second drive gear 426 may be configured to engage with a second rack 456 disposed on a second rail 450.

As shown in FIG. 4, a third rail 452 may include a third rack 458 engaged generally with the z-positioning subassembly 440. The z-positioning subassembly 440 may include a passive gear assembly 432 including a pinion 438, a worm gear 442 and a z-axis gear 444 that work in cooperation for moving the tool 402 along the z-axis 414.

Figure 5:
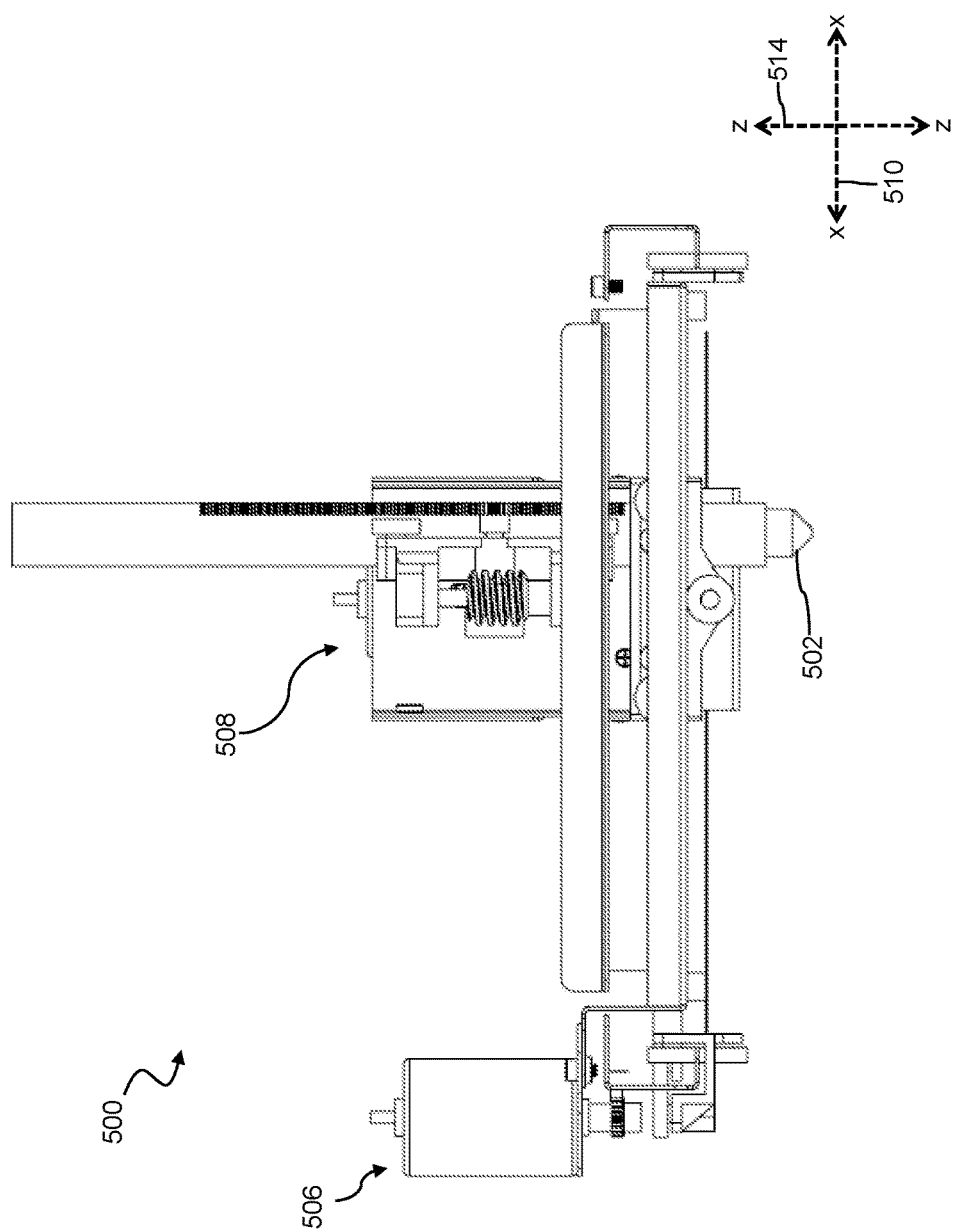
FIG. 5 is a front view of a robotic system for positioning along an x-axis, a y-axis, and a z-axis in three-dimensional space.

FIG. 5 is a front view of a robotic system for positioning along an x-axis, a y-axis, and a z-axis in three-dimensional space. The robotic system 500 may include a tool 502, an x-positioning system, a y-positioning system 506, and a z-positioning system 508. The robotic system 500 may be configured for positioning the tool 502 along an x-axis 510, a y-axis, and a z-axis 514 in three-dimensional space.

Figure 6:
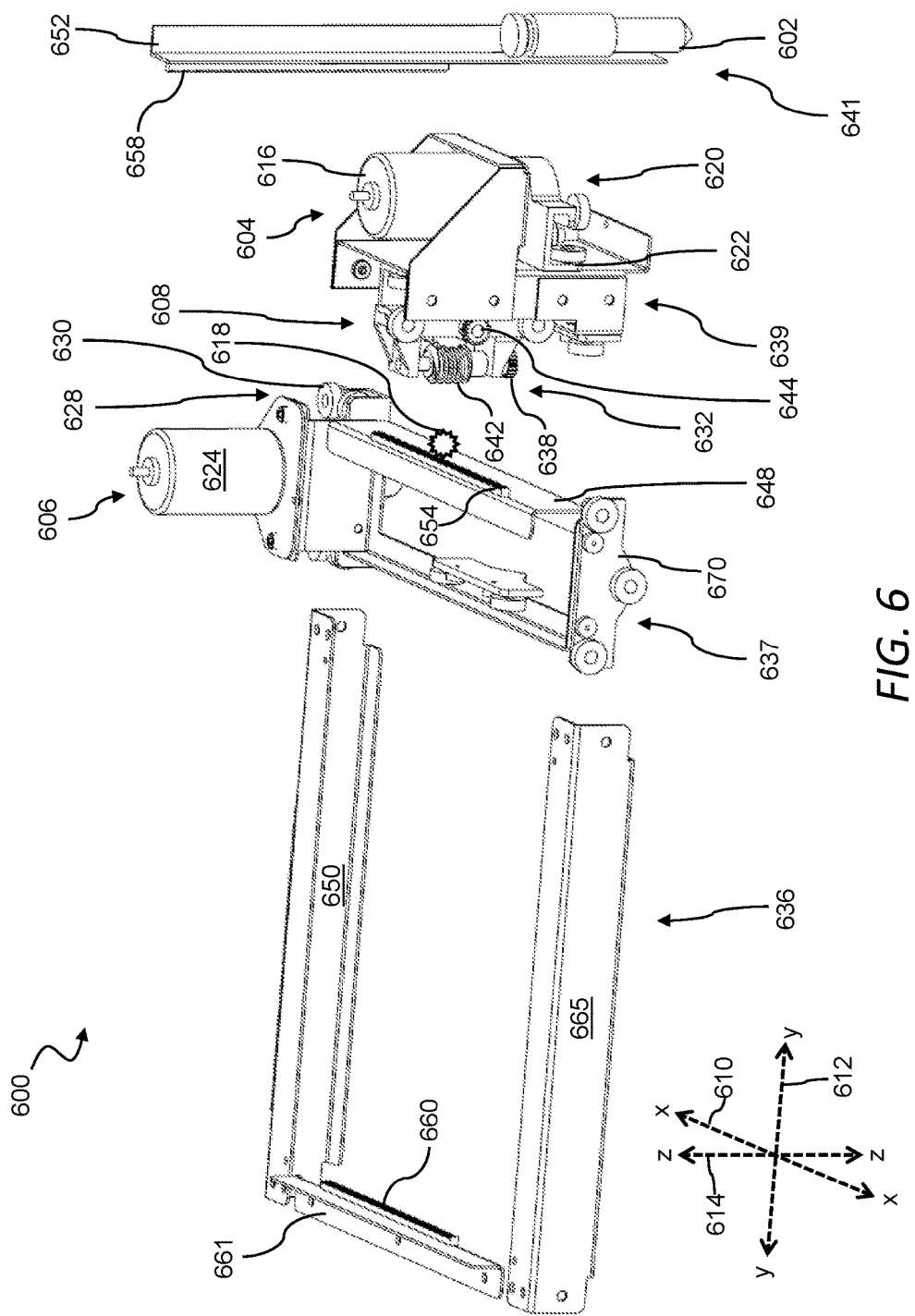
FIG. 6 is an exploded view of a robotic system for positioning along an x-axis, a y-axis, and a z-axis in three-dimensional space.

FIG. 6 is an exploded view of a robotic system for positioning along an x-axis, a y-axis, and a z-axis in three-dimensional space. As shown in FIG. 6, the robotic system 600 may be formed by components that interact and interconnect with one another as described below. These components may include a frame 636 (i.e., an outer frame), a y-axis gantry 637, an x-z axis coupling 639, and a z-axis arm 641.

The frame 636 may generally form the structure, or part of the structure, for a gantry movement system having a x-positioning system 604, a y-positioning system 606, and a z-positioning system 608 configured to allow for movement of a tool 602 along a first rail 648 disposed on the x-axis 610, a second rail 650 disposed on the y-axis 612, and a third rail 652 disposed on the z-axis 614. The frame 636 of the robotic system 600 may also include a fourth rail 661 having a fourth rack 660 for engagement with a passive gear assembly 632. Thus, the frame 636 may generally include the second rail 650, the fourth rail 661, and a side rail 665. The frame 636 and other structural components described herein may be formed from a variety of materials known in the art including without limitation sheet metal, molded plastic, and so forth.

The y-axis gantry 637 may include the y-positioning system 606. The y-positioning system 606 may be configured to move the tool 602 along the y-axis 612, and may include a second drive motor 624, a second drive gear (not shown in FIG. 6), and a second mechanical system 628. The second mechanical system 628 may include a second carriage 630 that engages with the second rail 650 of the frame 636 for movement of the tool 602 or a component of the y-positioning system 606 along the second rail 650. The y-axis gantry 637 may include one or more sub-frame carriages 670 to facilitate movement of one or more of the y-axis gantry 637 along the side rail 665 and the x-positioning system 604 along the fourth rail 661. The y-axis gantry 637 may also include the first rail 648 having a first rack 654 disposed thereon.

The x-z axis coupling 639 may include the x-positioning system 604. The x-positioning system 604 may be configured to move the tool 602 along the x-axis 610, and may include a first drive motor 616, a first drive gear 618, and a first mechanical system 620. The first mechanical system 620 may include a first carriage 622 that facilitates movement of the tool 602 or a component of the x-positioning system 604 along the first rail 648. The x-z axis coupling 639 may also contain the z-positioning subassembly including the passive gear assembly 632 having a pinion 638 for engagement with the fourth rack 660, and a worm gear 642 cooperating with the pinion 638 and engaged with a z-axis gear 644. The z-axis gear 644 (or a gear or pinion cooperating with the z-axis gear 644) may engage with the third rack 658, which is disposed on the third rail 652.

The z-axis arm 641 may include the third rail 652 and the tool 602. As shown in FIG. 6, the tool 602 may be attached to the third rail 652, such that movement of the z-axis gear 644 along the third rack 658 facilitates movement of the third rail 652 along the z-axis 614, and thus movement of the tool 602 along the z-axis 614.

FIG. 7 is a top perspective view of a robotic system for positioning along an x-axis, a y-axis, and a z-axis in three-dimensional space. Specifically, the robotic system 700 of FIG. 7 shows the y-positioning system 706 in a predetermined position along the y-axis 712 where the passive gear assembly 732 is engaged with the fourth rack 760 such that the passive gear assembly 732 is responsive to a movement of the x-positioning system 704 along the x-axis 710 to move the tool 702 along the z-axis 714.

FIG. 8 is a close-up view of a passive gear assembly. As shown in FIG. 8, the passive gear assembly 832 may include a pinion 838 for engagement with a rack, e.g., the fourth rack 860 included on the fourth rail 861. The pinion 838 may be in communication with a worm gear 842 or the like, where rotation of the pinion 838 causes a rotation of the worm gear 842. The worm gear 842 may be in communication with a z-axis gear, which may include a series of gears, e.g., a first gear 844 and a second gear 845. The first gear 844 may directly engage with the worm gear 842, and the second gear 845 may be in communication with the first gear 844 such that rotation of the first gear 844 causes a rotation of the second gear 845. The second gear 845 may be engaged with a rack, e.g., the third rack included on the third rail 852. In this manner, the passive gear assembly 832 may convert motion of the pinion 838 along the x-axis into motion of the third rail 852 relative to the second gear 845 along the z-axis. In an implementation where a tool is attached to the third rail 852, motion of the tool in along the z-axis may thus be achieved.

Figure 9:
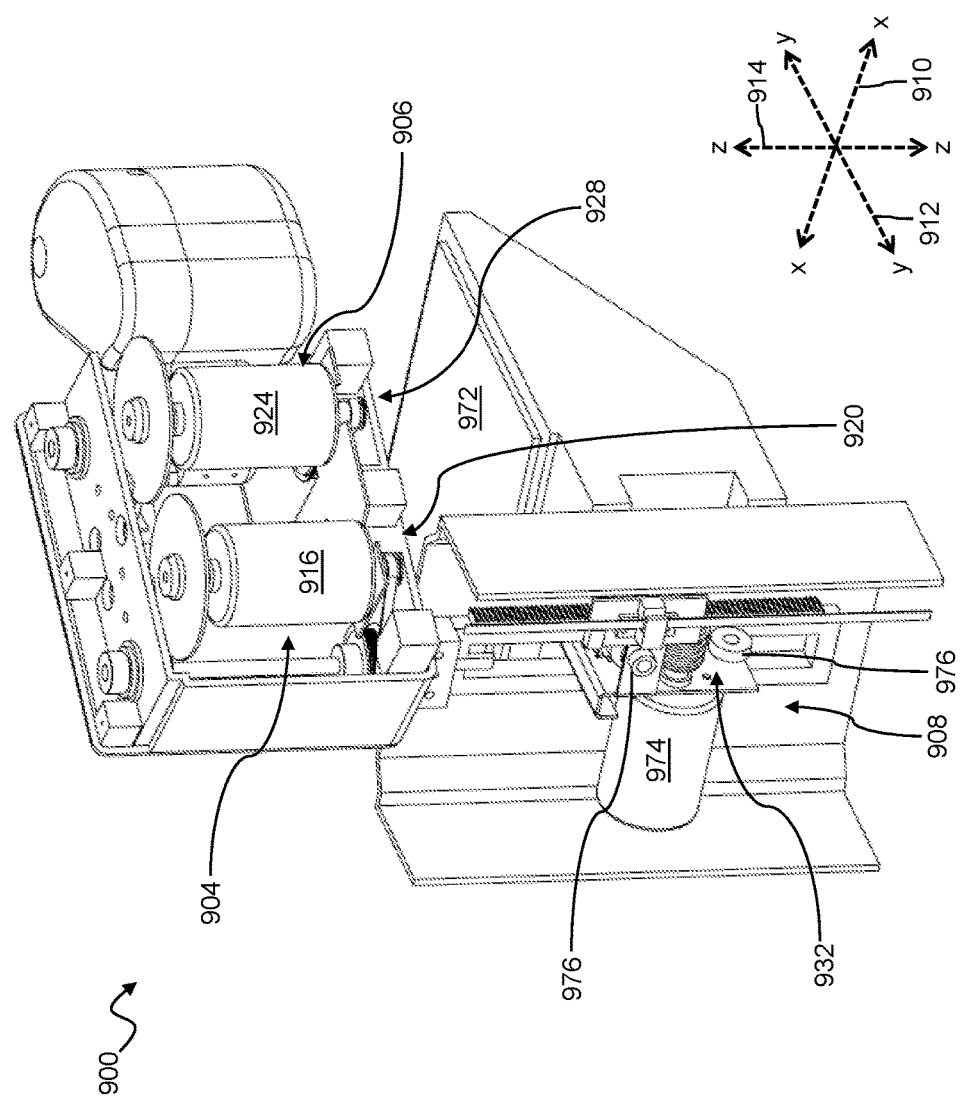
FIG. 9 is a perspective view of a robotic system for positioning a tool along an x-axis and a y-axis, and for positioning a platform along a z-axis.

FIG. 9 is a perspective view of a robotic system for positioning a tool along an x-axis and a y-axis, and for positioning a platform along a z-axis. Specifically, FIG. 9 shows a robotic system 900 similar to the robotic systems described above, i.e., having an x-positioning system 904, a y-positioning system 906, and a z-positioning system 908 for positioning a tool along an x-axis 910, a y-axis 912, and a z-axis 914 in three-dimensional space. The robotic system 900 in FIG. 9, however, may be specifically adapted such that a build platform 972 may be positioned along the z-axis 914. In this manner, the tool may be considered to be the build platform 972, particularly in an embodiment where the build platform 972 may be positioned along the x-axis 910, y-axis 912, and z-axis 914. Alternatively, the tool may be positioned along the x-axis 910 and y-axis 912, where the build platform 972 opposes the tool and is independently positioned along the z-axis 914 relative to the tool.

The x-positioning system 904 and y-positioning system 906 may be similar to those described above, having a first drive motor 916, first mechanical system 920, second drive motor 924, and second mechanical system 928. The z-positioning system 908, however, may include a passive gear assembly 932 configured to position the build platform 972 along the z-axis 914. The z-positioning system 908 may also or instead include a third drive motor 974 for driving a mechanical system (e.g., a mechanical system including the passive gear assembly 932) thereby moving the build platform 972 along the z-axis 914. In this embodiment, the passive gear assembly 932 may act as an active gear assembly.

In an aspect, the build platform 972 includes a spring mechanism that preloads the build platform 972. The z-positioning system 908 may include spring loaded bearings 976 or the like that transfer the preloaded force from the build platform 972 for use in moving the build platform 972 along the z-axis 914.

In one aspect, a robotic system for positioning along an x-axis, a y-axis, and a z-axis in three-dimensional space includes a controller, a tool opposing a build platform, and an x-positioning system including a first drive motor, a first drive gear, and a first mechanical system, where the first drive motor is responsive to signals from the controller to rotate the first drive gear, and the first mechanical system is coupled to the first drive gear and configured to respond to rotation of the first drive gear by moving the tool along an x-axis. The robotic system may further include a y-positioning system including a second drive motor, a second drive gear, and a second mechanical system, where the second drive motor is responsive to signals from the controller to rotate the second drive gear, and the second mechanical system is coupled to the second drive gear and configured to respond to rotation of the second drive gear by moving the tool along a y-axis. The robotic system may also include a z-positioning system including a passive gear assembly responsive to a movement of the x-positioning system along the x-axis to move the build platform along a z-axis when the y-positioning system is in a predetermined position along the y-axis.

In another aspect, a system includes a controller, a three-dimensional printing tool including an extruder, and an x-positioning system including a first drive motor, a first drive gear, and a first mechanical system, where the first drive motor is responsive to signals from the controller to rotate the first drive gear, and the first mechanical system is coupled to the first drive gear and is configured to respond to rotation of the first drive gear by moving the extruder along an x-axis. The system may further include a y-positioning system including a second drive motor, a second drive gear, and a second mechanical system, where the second drive motor is responsive to signals from the controller to rotate the second drive gear, and the second mechanical system is coupled to the second drive gear and is configured to respond to rotation of the second drive gear by moving the extruder along a y-axis. The system may also include a z-positioning system including a passive gear assembly responsive to a movement of the x-positioning system along the x-axis to move the extruder along a z-axis when the y-positioning system is in a predetermined position along the y-axis, where the controller is configured to engage the z-positioning system to change a z-axis position of the extruder between each layer of fabrication in a three-dimensional fabrication process.

Figure 10:
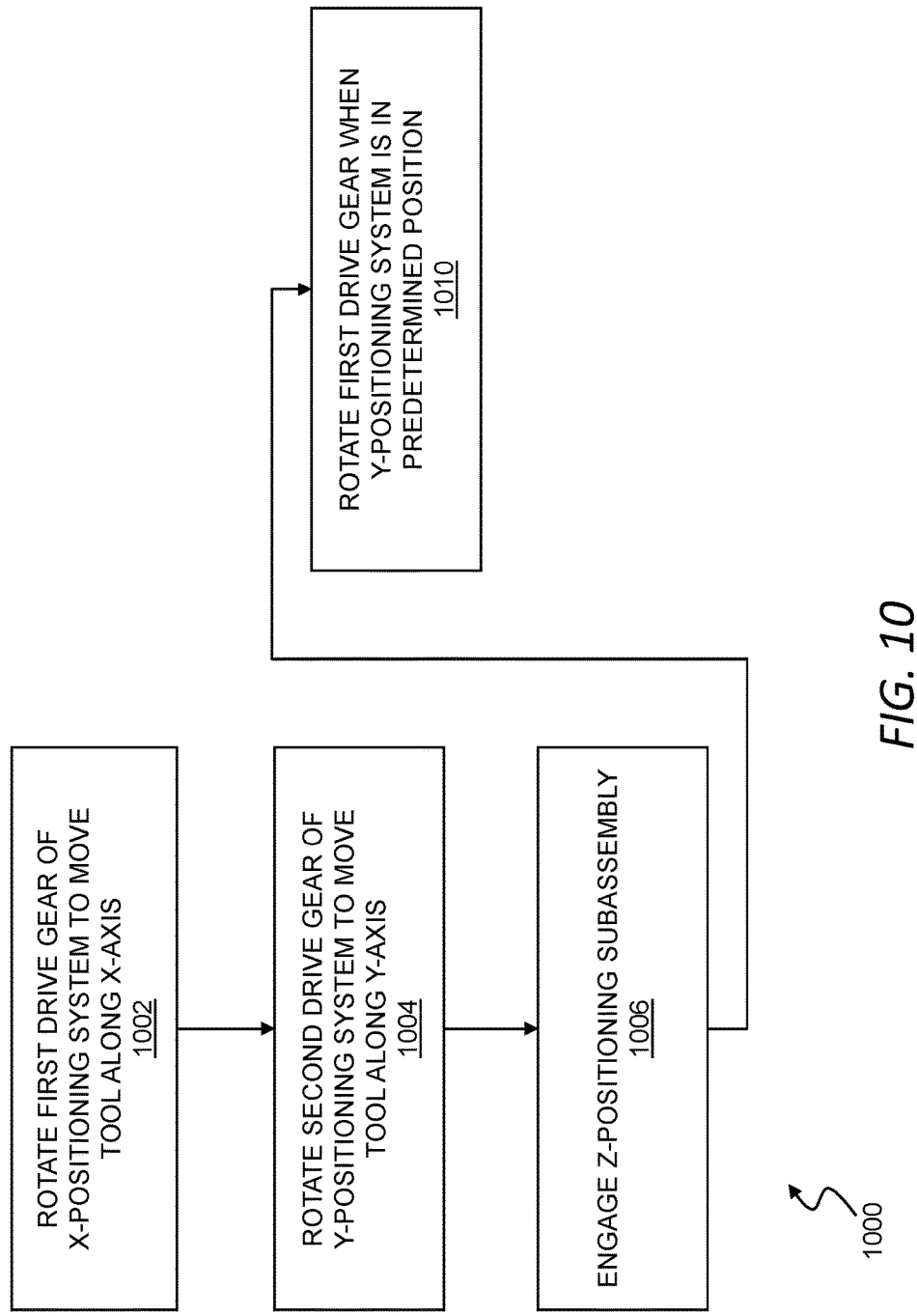
FIG. 10 is a flowchart of a method for passive z-axis alignment.

FIG. 10 is a flowchart of a method for passive z-axis alignment. In general, the systems described above may be used to engage and use a passive z-positioning subassembly in order to position a tool or the like along the z-axis through appropriately coordinated movements of an x-y gantry.

As shown in step 1002, the method 1000 may include rotating a first drive gear of an x-positioning system of a tool thereby moving the tool along an x-axis. The x-positioning system may include a z-positioning subassembly.

As shown in step 1004, the method 1000 may include rotating a second drive gear of a y-positioning system of the tool thereby moving the tool along a y-axis. Steps 1002 and 1004 describe general x-y plane movements as contemplated herein.

As shown in step 1006, the method 1000 may include engaging a passive z-positioning subassembly. This may be performed, for example, by moving the y-positioning system into a predetermined position along the y-axis. In this position, movement of the x-positioning system along the x-axis can be converted by the passive z-positioning system into a corresponding z-axis movement.

As shown in step 1010, the method 1000 may include rotating the first drive gear of the x-positioning system when the y-positioning system is in the predetermined position. This movement along the x-axis may be translated into a z-axis movement through any suitable gear assembly or the like—the passive z-positioning subassembly noted above—to result in moving the tool along the z-axis.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

It will be appreciated that the devices, systems, and methods described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A robotic system for positioning along an x-axis, a y-axis, and a z-axis in three-dimensional space, the robotic system comprising:
   a controller;
   a tool;
   an x-positioning system including a first drive motor, a first drive gear, and a first mechanical system, the first drive motor releasably coupled to the first drive gear when in a first position and responsive to signals from the controller to rotate the first drive gear in the first position, and the first mechanical system coupled to the first drive gear and configured to respond to rotation of the first drive gear by moving the tool along an x-axis;
   a y-positioning system including a second drive motor, a second drive gear, and a second mechanical system, the second drive motor responsive to signals from the controller to rotate the second drive gear, and the second mechanical system coupled to the second drive gear and configured to respond to rotation of the second drive gear by moving the tool along a y-axis;
   a z-positioning system including a gear assembly aligned for engagement with the first drive motor; and
   a toggle engaged with the first drive motor, the toggle including a control for switching the first drive motor from the first position to a second position where it is decoupled from the first drive gear and coupled to the gear assembly of the z-positioning system, the gear assembly responsive to movement of the first drive motor to move the tool along a z-axis when the first drive motor is in the second position.

2. The robotic system of claim 1 wherein the tool includes a three-dimensional printing tool.

3. The robotic system of claim 2 wherein the three-dimensional printing tool includes an extruder.

4. The robotic system of claim 2 wherein the three-dimensional printing tool includes a laser.

5. The robotic system of claim 2 wherein the three-dimensional printing tool includes a welding device.

6. The robotic system of claim 2 wherein the three-dimensional printing tool includes a heater.

7. The robotic system of claim 1 wherein the tool includes at least one of a camera, a fan, a cutting device, and a light source.

8. The robotic system of claim 1 wherein the first drive motor includes a stepper motor.

9. The robotic system of claim 1 wherein the first drive motor includes a DC motor.

10. The robotic system of claim 1 wherein the gear assembly of the z-positioning system includes at least one of a screw gear, a bevel gear, a worm gear, and a rack and pinion gear.

11. The robotic system of claim 1 wherein the controller is configured to operate the toggle to decouple the first drive motor from the first drive gear and to couple the first drive motor to the gear assembly of the z-positioning system.

12. The robotic system of claim 1 wherein the tool includes a three-dimensional printing tool having an extruder, and wherein the z-positioning system is used to reset a height of the extruder for a three-dimensional fabrication process.

13. The robotic system of claim 1 wherein the x-positioning system, y-positioning system, and z-positioning system are part of a gantry movement system configured to allow for movement of the tool along a first rail disposed on the x-axis, a second rail disposed on the y-axis, and a third rail disposed on the z-axis.

14. The robotic system of claim 1 wherein the z-positioning system includes a passive gear assembly.

15. The robotic system of claim 14 wherein the passive gear assembly is responsive to a movement of the first drive motor to move the tool along the z-axis when the first drive motor is in the second position.

16. A robotic system for positioning along an x-axis, a y-axis, and a z-axis in three-dimensional space, the robotic system comprising:
a controller;
an extruder;
an x-positioning system including a first drive motor, a first drive gear, and a first mechanical system, the first mechanical system coupled to the first drive gear and configured to respond to rotation of the first drive gear by moving the extruder along an x-axis;
a y-positioning system including a second drive motor, a second drive gear, and a second mechanical system, the second drive motor responsive to signals from the controller to rotate the second drive gear, and the second mechanical system coupled to the second drive gear and configured to respond to rotation of the second drive gear by moving the extruder along a y-axis;
a third drive motor;
a z-positioning system including a gear assembly aligned for engagement with the third drive motor; and
a toggle engaged with the third drive motor, the toggle including a control for switching the third drive motor from a first position where the third drive motor drives a filament of build material through the extruder to a second position where it is decoupled from the extruder and coupled to the gear assembly of the z-positioning system, the gear assembly responsive to movement of the third drive motor to move the extruder along a z-axis when the first drive motor is in the second position.

17. The robotic system of claim 16 wherein the first drive motor includes a stepper motor.

18. The robotic system of claim 16 wherein the first drive motor includes a DC motor.

19. The robotic system of claim 16 wherein the gear assembly of the z-positioning system includes at least one of a screw gear, a bevel gear, a worm gear, and a rack and pinion gear.

20. The robotic system of claim 16 wherein the controller is configured to operate the toggle to selectively couple the third drive motor to the z-positioning system or the extruder.

* * * * *